(12) United States Patent
Voit et al.

(10) Patent No.: US 10,845,094 B2
(45) Date of Patent: Nov. 24, 2020

(54) COMPOSITE HEAT INSULATION SYSTEM

(71) Applicant: WACKER CHEMIE AG, Munich (DE)

(72) Inventors: Harald Voit, Reischach (DE); Steffen Dörrich, Munich (DE); Verena Geiger, Burghausen (DE); Martin Petri, Emmerting (DE); Erich Schaffer, Duttendorf (AT); Fridolin Stary, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 106 days.

(21) Appl. No.: 16/327,515

(22) PCT Filed: Jun. 23, 2017

(86) PCT No.: PCT/EP2017/065572
§ 371 (c)(1),
(2) Date: Feb. 22, 2019

(87) PCT Pub. No.: WO2018/233848
PCT Pub. Date: Dec. 27, 2018

(65) Prior Publication Data
US 2019/0178533 A1   Jun. 13, 2019

(51) Int. Cl.
*F24S 40/58* (2018.01)
*B01D 5/00* (2006.01)
(Continued)

(52) U.S. Cl.
CPC .............. *F24S 40/58* (2018.05); *B01D 5/009* (2013.01); *B01D 5/0075* (2013.01); *F03G 6/00* (2013.01);
(Continued)

(58) Field of Classification Search
CPC . F24S 40/58; F24S 80/20; F24S 40/60; Y02E 30/40; Y02E 60/142; Y02E 70/30;
(Continued)

(56) References Cited

U.S. PATENT DOCUMENTS

| 4,413,615 A | 11/1983 | Sigworth |
| 2011/0146959 A1 | 6/2011 | Root |
| 2012/0274069 A1 | 11/2012 | Venetos et al. |

FOREIGN PATENT DOCUMENTS

| CN | 102753823 A | 10/2012 |
| DE | 102011001587 A1 | 2/2012 |

(Continued)

*Primary Examiner* — Jason Lau
(74) *Attorney, Agent, or Firm* — Brooks Kushman P.C.

(57) ABSTRACT

The invention provides a process for removal of gaseous decomposition products from high temperature heat transfer fluid HTF of an operational solar thermal power plant having an HTF circuit,
in which a volume increase of the HTF in the HTF circuit which is caused by incident solar radiation in an HTF-traversed solar field and consequent heating by day takes place regularly in a day-night cycle and the additional volume formed by the volume increase is collected from the HTF circuit in an expansion vessel,
a portion of the additional volume of the HTF is transferred into a drainage vessel operated at relatively low pressure in which gaseous decomposition products and low-boiling constituents escape from the HTF, wherein the low-boiling constituents are condensed,
and during the volume contraction of the HTF occurring during the night-time cooling a portion of the additional volume of the HTF is recycled from the drainage vessel into the expansion vessel and from the expansion vessel into the HTF circuit,
(Continued)

wherein the volumes in the expansion vessel and the drainage vessel becoming vacant as a result of the transferrals of the HTF are filled with inert gas.

10 Claims, 2 Drawing Sheets

(51) Int. Cl.
| | |
|---|---|
| *F24S 40/60* | (2018.01) |
| *F03G 6/00* | (2006.01) |
| *F24S 60/10* | (2018.01) |
| *F24S 80/20* | (2018.01) |
| *F28D 20/00* | (2006.01) |

(52) U.S. Cl.
CPC ............... *F24S 40/60* (2018.05); *F24S 60/10* (2018.05); *F24S 80/20* (2018.05); *F28D 2020/0047* (2013.01)

(58) Field of Classification Search
CPC ......... Y02E 10/46; Y02E 20/14; Y02E 50/14; Y02E 60/145; Y02E 60/15; Y02E 60/321; Y02E 10/12; Y02E 10/14; Y02E 10/40; Y02E 10/546; Y02E 20/16; Y02E 20/18; Y02E 20/363; Y02E 50/343; F28D 20/02; F28D 2020/0047; F28D 20/0034; F28D 2020/0069; F28D 2020/0078; F28D 2020/0091; F28D 20/0039; F28D 20/028; F28D 11/02; F28D 1/022; F28D 2020/0065; F28D 2020/0082; F28D 2020/0095; F28D 2021/0059; F28D 20/0052; F28D 20/0056; F28D 20/021; F28D 20/025; F28D 21/0003; F28D 21/0012; F28D 7/024; F28D 7/06; F28D 7/08; F28D 7/085; Y02P 20/129; Y02P 70/34; Y02P 20/152; Y02P 80/11; Y02P 10/143; Y02P 20/582; Y02P 30/20; Y02P 30/446; Y02P 40/57; Y02P 70/521
See application file for complete search history.

(56) References Cited

FOREIGN PATENT DOCUMENTS

| | | |
|---|---|---|
| DE | 102010039813 A1 | 3/2012 |
| WO | 06081608 A1 | 8/2006 |
| WO | 12017017 A1 | 2/2012 |
| WO | 12025389 A1 | 3/2012 |

COMPOSITE HEAT INSULATION SYSTEM

CROSS-REFERENCE TO RELATED APPLICATIONS

This application is a U.S. National Phase Application of PCT/EP/2017/065572, filed. Jun. 23, 2017 the contents of which are incorporated herein by reference in their entireties for all purposes.

FIELD OF THE INVENTION

The invention relates to a process for the removal of gaseous decomposition products from high temperature heat transfer fluid from an operational solar thermal power plant.

BACKGROUND OF THE INVENTION

A solar thermal power plant is a power plant which, via absorbers, uses heat from the sun as the primary energy source. Consequently, the designations solar thermal power plant or thermal solar power plant and also CSP power plant (concentrated solar power plant) are customary for a radiation-concentrating power plant.

In the absorber solar radiation heats to high temperatures, a high temperature heat transfer fluid (HTF) flowing through a solar field. In the HTF circuit the heat energy transferred to the HTF is ultimately passed to a heat consumer (generally a thermal steam power plant), as a result of which the HTF is cooled again and then resupplied to the absorbers. A plurality of absorbers are generally connected in series to form loops and a plurality of loops are generally connected in parallel to form a solar field (S).

Continually formed in the employed heat transfer fluids due to the high thermal stresses inside a solar thermal power plant are gaseous/low-boiling decomposition products (in the case of silicone oils especially $H_2$, $CH_4$, $C_2H_6$) which need to be removed during operation to ensure problem free functioning of the power plant.

Prior art approaches for the removal of decomposition products from high temperature heat transfer oils such as for example biphenylene in CSP power plants comprise either partial or complete replacement of the heat transfer fluid with external processing or in situ processing in so-called processing plants consisting of up to 3 interconnected columns as described in DE102011001587A1.

Replacement of the heat transfer fluid requires the provision of a very large amount of heat transfer fluid to replace the heat transfer fluid to be purified in order that the CSP power plant may remain in operation.

BRIEF SUMMARY OF THE INVENTION

The present invention provides a process for removal of gaseous decomposition products from high temperature heat transfer fluid HTF of an operational solar thermal power plant having an HTF circuit, in which regularly taking place in a day-night cycle is a volume increase of the HTF in the HTF circuit which is caused by incident solar radiation in an HTF-traversed solar field and consequent heating by day and the additional volume formed by the volume increase is collected from the HTF circuit in an expansion vessel, a portion of the additional volume of the HTF is transferred into a drainage vessel operated at relatively low pressure in which gaseous decomposition products and low-boiling constituents escape from the HTF, wherein the low-boiling constituents are condensed, and during the volume contraction of the HTF occurring during the night-time cooling a portion of the additional volume of the HTF from the drainage vessel is recycled from the drainage vessel into the expansion vessel and from the expansion vessel into the HTF circuit or directly from the drainage vessel into the HTF circuit, wherein the volumes in the expansion vessel and the drainage vessel becoming vacant as a result of the transferrals of the HTF are filled with inert gas.

DETAILED DESCRIPTION OF PREFERRED EMBODIMENTS

Figure 1:
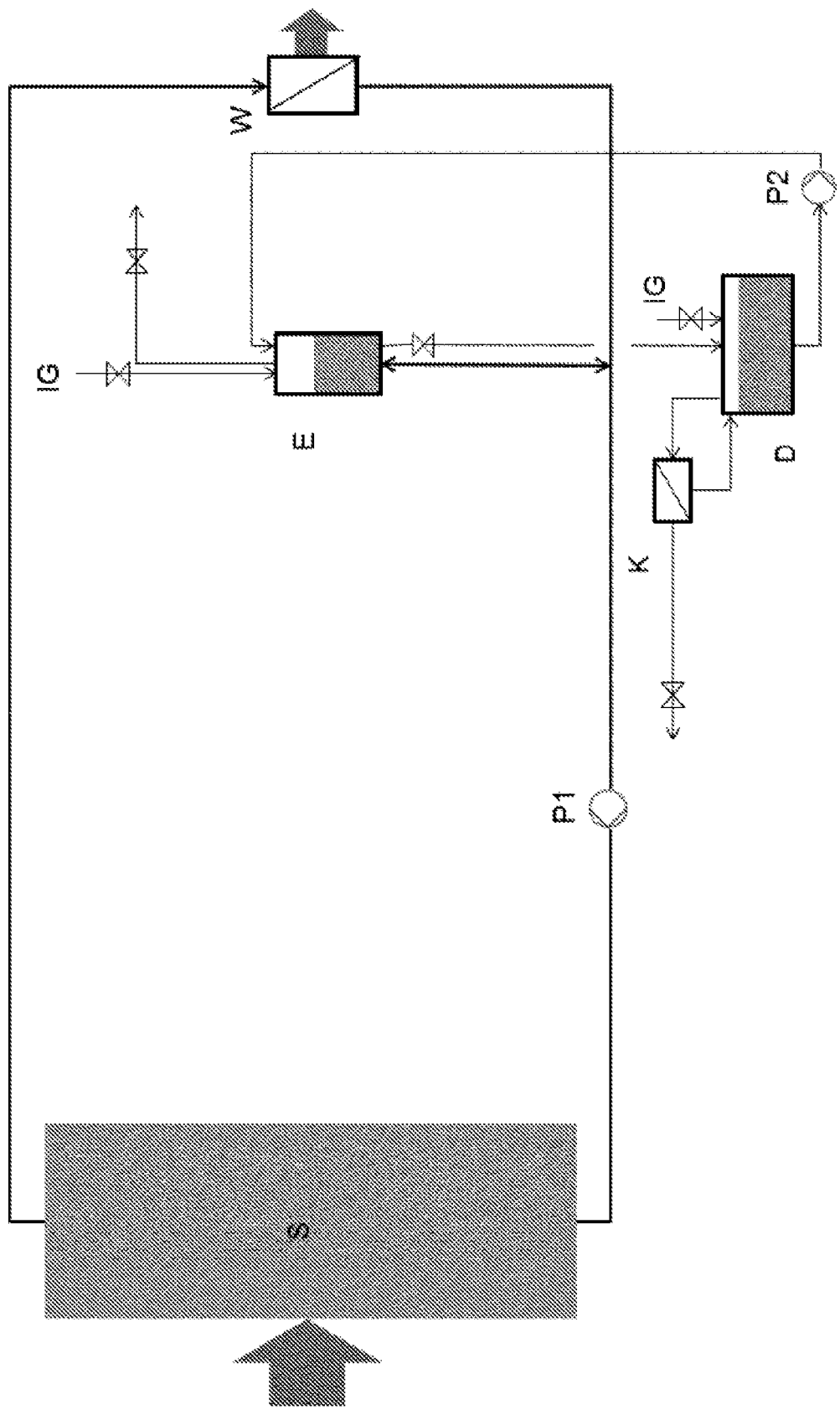
FIG. 1 is a schematic view of an exemplary process for gas removal from heat transfer fluid of the present invention.

In the solar thermal power plant large temperature differences occur in the solar field between day and night. During night-time cooling the density increases; a volume contraction of the HTF in the solar field takes place. During morning heating the density of the HTF in the solar field decreases; a volume expansion of the HTF takes place.

The daily volume change of the HTF occurring in any solar thermal power plant is utilized in conjunction with an expansion vessel present in any solar thermal power plant with an additional drainage vessel (also known as an overflew vessel) in order with suitable and advantageous implementation, interconnection and control to simultaneously remove gaseous decomposition products during operation.

In the solar thermal power plant the processing of the HTF is carried out on a continuous basis without requiring an additional processing plant consisting of up to three columns as described in DE 102011001587A1.

The required additional processing plant for the HTF is therefore reduced to a suitable control concept, a condensation apparatus and an apparatus for recycling the HTF from the drainage vessel into the expansion vessel or directly into the HTF circuit, for example a return pump.

The volume increase of the HTF would result in an increase of the fill level in the expansion vessel. Therefore, a portion of the additional volume of the HTF is transferred into the drainage vessel. The decompression in the drainage vessel reduces the solubility in the HTF of gases and low-boiling constituents of the HTF. This removes the gaseous decomposition products from the HTF. Low-boiling constituents of the HTF simultaneously evaporate. The low-boiling constituents are condensed and may be recycled into the HTF, for example into the drainage vessel.

The preferably multi-stage condensation ensures the recycling of low-boiling constituents of the HTF while the gaseous decomposition products are continuously removed from the HTF. As a result, of the combination of an expansion vessel of preferably smaller dimensions than the drainage vessel with a preferably large drainage vessel which is operated at relatively low pressure and into which the daily volume change is shifted, both the capital costs and the consumption of inert gas are minimized. At the same time the decompression in the drainage vessel optimizes the removal of gaseous and low-boiling constituents at minimal energy cost. In particular, thermal auxiliary energy is not required for the degassing but rather only for the condensation.

The expansion vessel and or the drainage vessel are preferably provided with pressure and fill-level control means.

The inert gas is preferably selected from He, Ar, Ne and $N_2$. $N_2$ is particularly preferred as the inert gas.

In the expansion vessel a sufficient pressure in the HTF circuit and a sufficient inertization is preferably ensured by blanketing with inert gas. Gaseous decomposition products thus remain dissolved in the HTF and a phase separation and the risk of cavitation in the heat-transfer medium pumps is thus prevented.

A preferably installed additional fill-level control means in the expansion vessel preferably actuates a liquid-side flash valve and decompresses the required volume of HTF into the low-pressure drainage vessel.

As a result of the fill-level control means in the expansion vessel the volume change may be almost completely shifted into the drainage vessel at a relatively low pressure level. This makes it possible to drastically reduce the total inert gas consumption while likewise reducing the proportions of inert gas and proportions of decomposition products (in particular $H_2$) dissolved in the HTF.

It is preferable when by means of a partial condensation in the breather conduit of the drainage vessel the low-boiling constituents of the HTF are condensed out of the gas/vapour mixture forming in the drainage vessel and recycled into the drainage vessel.

The preferred fill-level control means in the expansion vessel actuates the return pump which returns the required HTF volume from the drainage vessel into the expansion vessel or directly into the HTF circuit.

The HTF volume removed from the drainage vessel is replaced by inert gas at low pressure. This ensures inertization in the overflow vessel.

Employable as the HTF are hydrocarbons, in particular synthetic oils based on aromatics, such as bi-, tri- or tetracyclic phenyl or phenoxy compounds. These decompose over time to form low-boiling proportions of typically monocyclic molecules. Especially employed as the HTF are silicone oils, such as Helisol® (Wacker Chemie AG) since these do not form high-boiling decomposition products. It is preferable when the HTF consists substantially of methylpolysiloxanes, in particular of linear or cyclic methylpolysiloxanes or mixtures thereof.

Preferred are methylpolysiloxanes selected from linear compounds of general formula I $$Me_3SiO-(Me_2SiO)_x-SiMe_3 \quad (I),$$

and cyclic compounds of general formula II $$(Me_2SiO)_y, \quad (II),$$

and mixtures thereof, wherein
  Me represents methyl radical,
  x takes values greater than or equal to zero and the arithmetic mean of x over all linear methylpolysiloxanes weighted for the amount of substance proportions is between 3 and 20 and
  y takes values greater than or equal to 3 and the arithmetic mean of y over all cyclic methylpolysiloxanes weighted for the amount of substance proportions is between 3 and 6.

The variable x preferably takes values between zero and 100, particularly preferably between zero and 70, very particularly preferably between zero and 40. The arithmetic mean of x over all linear methylpolysiloxanes weighted for the amount of substance proportions is preferably between 4 and 15, particularly preferably between 5 and 10, in each case including the recited boundary values.

The variable y preferably takes values between 3 and 100, particularly preferably between 3 and 70, very particularly preferably between 3 and 40. The arithmetic mean of y over all cyclic methylpolysiloxanes weighted for the amount of substance proportions is preferably between 3.5 and 5.5, particularly preferably between 4 and 5, in particular between 4 and 4.5, in each case including the recited boundary values.

The numerical ratio of the $Me_3Si$ chain end groups in the compounds of general formula I to the sum of $Me_2SiO$ units in the compounds of general formulae I and II is preferably at least 1:2 und at most 1:10. The numerical ratio of the $Me_3Si$ chain end groups in general formula I to the sum of $Me_2SiO$-units in general formulae I and II is preferably at least 1:2.5 and at most 1:8, especially preferably at least 1:3 and at most 1:6.

It is preferable when the sum of the proportions of all cyclic methylpolysiloxanes of general formula II is at least 10 mass %, particularly preferably at least 12.5 mass %, especially at least 15 mass % and at most 40 mass %, particularly preferably at most 35 mass % and in particular at most 30 mass %.

Likewise preferred are methylpolysiloxanes selected from branched compounds of general formula II $$(Me_3SiO_{1/2})_w(SiO_{4/2})_z, \quad (II)$$

in which
  w represents integers from 4 to 20,
  z represents integers from 1 to 15,
  Me represents methyl radical,
    wherein
      the sum of the proportions of all siloxanes of general formula I is at least 95 mass % based on the total heat transfer fluid.

The units $(Me_3SiO_{1/2})_w$ are referred to as M-groups and the units $(SiO_{4/2})_z$ as Q-groups.
  w preferably represents integers up to 15.
  z preferably represents integers from 1 to 5.
  w+z preferably takes values up to 50, in particular up to 20.

The viscosity of the HTF at 25° C. is preferably 1 to 100 mPa*s, particularly preferably 1 to 10 mPa*s, in each case measured with a µVISK viscometer from RheoSense Inc.

The HTF may have a monomodal, bimodal or multimodal molar mass distribution and the molar mass distribution may simultaneously be narrow or broad.

The temperatures of the HTF in the solar field in daytime operation are preferably up to 490° C., in particular 150° C. to 475° C., especially preferably 300° C. to 450° C.

The temperatures of the HTF in the solar field in nighttime operation are preferably up to 300° C., in particular −40° C. to 280° C., especially preferably 65° C. to 250° C.

The pressure in the HTF circuit is preferably up to 1 to 50 bar, in particular 15 to 40 bar, especially preferably 20 to 35 bar.

The gaseous decomposition products are gaseous at the operating temperature and the operating pressure of the drainage vessel. The operating temperature of the drainage vessel is preferably 50° C. to 200° C., especially preferably 65° C. to 180° C. The operating pressure (absolute) of the drainage vessel is preferably 0.8 to 20 bar, in particular 1 to 10 bar.

It is preferable when the operating pressure of the drainage vessel is slightly above ambient pressure to prevent entry of air.

In the case of silicone oils the gaseous decomposition products are in particular $H_2$, $CH_4$, $C_2H_6$, trimethylsilane and tetramethylsilane.

The low-boiling constituents have a vapour pressure of at least 1 mbar at 20° C.

In the case of silicone oils the low-boiling constituents are in particular hexamethyldisiloxane, octamethyltrisiloxane, hexamethylcyclotrisiloxane (D3), octamethylcyclotetrasiloxane (D4). The low-boiling constituents may also be removed from the HTF circuit and employed as intermediate or end products in many chemical processes or applications.

In a particular embodiment heat is intermediately stored in salt melt tanks. To this end, heat is transferred from the HTF circuit to a salt melt. When the solar field (S) is not providing heat, heat is recycled from the hot salt melt into the HTF circuit. In this way the heat energy from the HTF may be passed to a heat consumer on a continuous basis.

The volume increase of the HTF in the HTF circuit in a solar thermal power plant between daytime and night-time operation is typically 10% to 50%, preferably 20% to 40%.

It is preferable, when 10% to 50%, in particular 20% to 40%, of the additional volume of the HTF is transferred into the drainage vessel.

A multistage implementation of the condensation of the low-boiling constituents from the HTF is particularly advantageous. Through stepwise lowering of the condensation temperature a large amount of low-boiling constituents may be recovered even in a dry air cooling condenser not requiring cooling water at a high condensation temperature of 50° C. to 80° C.

In the first partial condensation stage it is therefore ensured when using silicone oil as HTF that freezing on the heat exchanger surfaces is avoided since the condensation temperature is above the freezing point of the silicone oil component that freezes at the highest temperature (hexamethyltrisiloxane D3 at 63.7° C. at 1 bar).

The further partial condenser stages are preferably conceived such that freezing/thawing of low-boiling constituents of the HTF, preferably silicone oil constituents, is possible in the daily cycle.

Through a low-temperature condensation in the last partial condensation stage, <=−20° C. for silicone oils, the loss of lowest-boiling silicone oil components (hexamethyldisiloxane) can be reduced to negligibly small values.

On account of their low mass flow the uncondensable gaseous decomposition products may, depending on local emissions limits, either be safely released into the atmosphere or flared or adsorbed in an absorber (for example over activated carbon). The process for gas removal from heat transfer fluids may therefore be designed to be emissions-free.

The process is elucidated with FIG. 1:

In a solar thermal power plant the incident solar radiation heats the solar field (S). In the solar field (S) heat is transferred to HTF by a series and parallel interconnection of absorbers (receivers) in the HTF circuit which is preferably operated by pump (P1). The recirculated heat energy is passed to a heat consumer (W).

The heating brings about a volume increase of the HTF. The additional volume of the HTF is collected in an expansion vessel (E) whose gas space is filled with inert gas (IG). A portion of the additional volume of the HTF is transferred into the drainage vessel (D).

A relatively low pressure is established in the drainage vessel (D). This causes a mixture of gaseous decomposition products and low-boiling constituents to escape from the HTF. The mixture is passed through the condensation means (K) where the low-boiling constituents are condensed out. The low-boiling constituents are recycled into the drainage vessel (D). When no solar radiation is incident on the solar field (S) which is the case regularly during the night-time cooling a volume contraction of the HTF in the HTF circuit takes place. A portion of the HTF from the drainage vessel (D) is preferably pumped back into the expansion vessel (E) via pump (P2). The gas space of the expansion vessel (E) is filled with inert gas (IG).

HTF is recycled into the HTF circuit from the expansion vessel (E). Alternatively, a portion of the HTF from the drainage vessel (D) may also be directly pumped back into the HTF circuit preferably via pump (P2).

Figure 2:
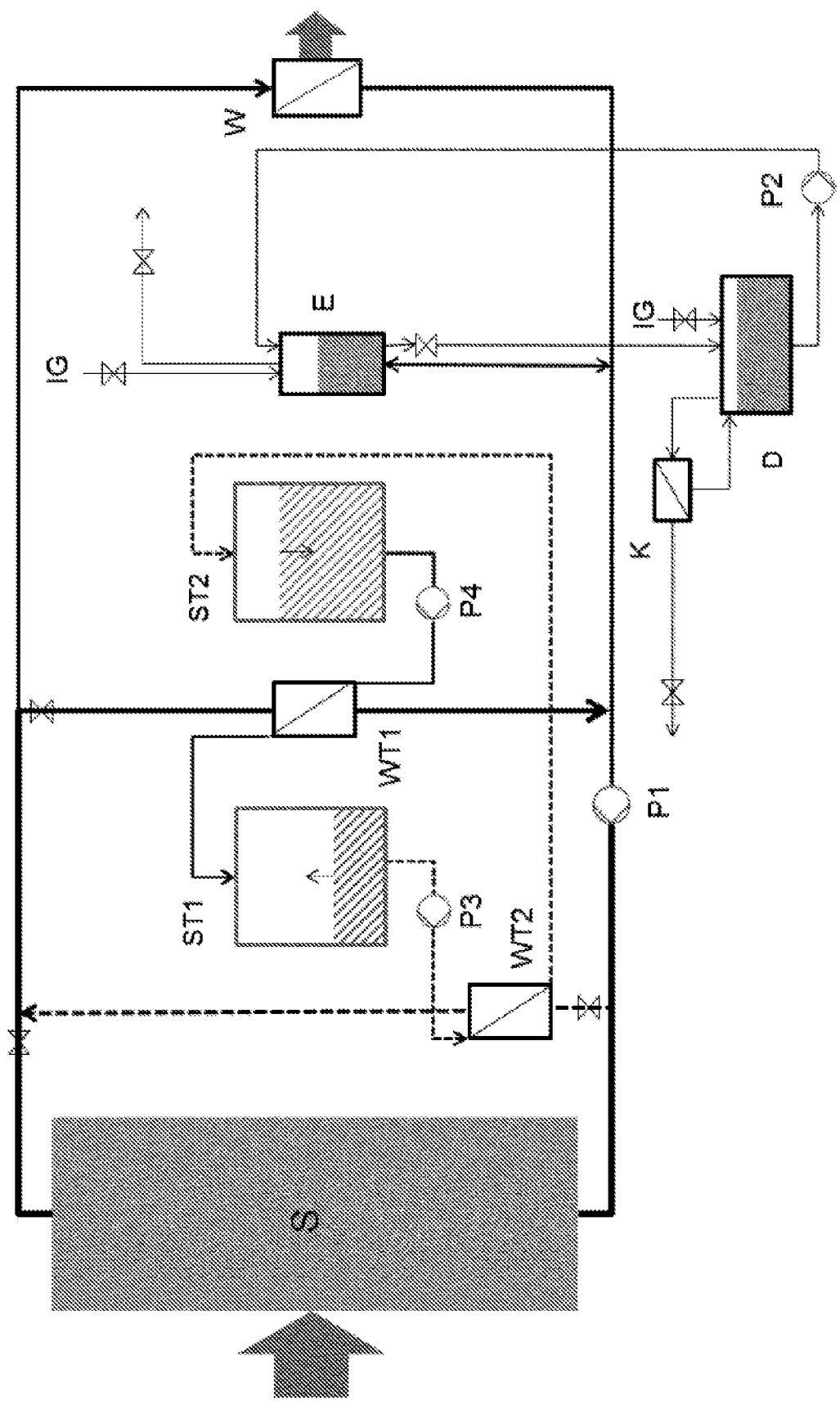
FIG. 2 is a schematic view of an exemplary process for storing heat of the present invention.

The process in which heat is intermediately stored in salt melt tanks is elucidated with FIG. 2:

Heat from the HTF circuit is transferred to a salt melt in the heat exchanger (WT1).

To this end cold salt melt from salt melt, tank (ST2) is pumped by means of pump (P4) through the heat exchanger (WT1), heated therein and pumped into the salt melt tank (ST1).

When the solar field (S) is not delivering heat, hot salt melt from salt melt tank (ST1) is pumped by means of pump (P3) through the heat exchanger (WT2) and therein transfers heat into the HTF circuit. The cooled salt melt is collected in the salt melt tank (ST2).

In the examples which follow all reported amounts and percentages are based on weight, all pressures are 0.10 MPa (abs.) and all temperatures are 20° C. unless otherwise stated.

EXAMPLES

A CSP power plant having salt storage tanks passes heat (W) to a conventional steam power plant with a nominal electrical output of 50 MW. The CSP power plant is operated with Helisol 5A (Wacker Chemie), a mixture of methylpolysiloxanes, as the HTF. During the day in the solar field (S) the HTF entry temperature is 300° C. and the HTF exit temperature is 425° C. Overnight the HTF on average cools to 200° C. Annual operating hours at nominal output are 3219 hours. The total mass of HTF in the CSP power plant is 1200 t. The daily heating time taken to reach operating temperatures in the solar field is 1 hour. The volume increase of the HTF during the daily heating time results in a mass displacement of 253 t. (21% of the total HTF mass) from the HTF circuit into the expansion vessel (E) and into the drainage tank (D). During night-time cooling the volume contraction in the HTF circuit results in a reverse mass displacement from the drainage tank ultimately into the HTF circuit. Formed daily in the CSP power plant under these conditions are 0.03 kg of $H_2$, 2.7 kg of alkanes (methane, ethane) and 1.6 kg of methylsilanes (trimethylsilane and tetramethylsilane) which, for long-term steady-state operation, require removal.

Example 1

The pressure in the expansion vessel is set to 24.8 bar and the fill level is kept constant. The pressure in the drainage tank is set to 1.5 bar. In both containers ambient-temperature nitrogen is used for pressure control and simultaneous inertization. The expansion vessel and the drainage tank are ideally insulated (boundary condition).

During morning heating of the solar field the fill-level control means in the expansion vessel actuates a flash valve that conveys HTF from the expansion vessel into the drainage vessel and decompresses it to the pressure thereof. The evaporated low-boiling HTF constituents are recovered from the inert gas ($N_2$) and the uncondensable decomposition products by a two-stage partial condensation.

The first partial condenser is a dry air cooler operated at a condensation temperature of 65° C. Only 0.7 t of gaseous and vapourous products exit the first partial condenser over the day and these are post-treated in the second partial condensation stage. The second partial condensation stage is a low-temperature condenser operated at a condensation temperature of −20° C. The off-gas from the $2^{nd}$ partial condenser is only 0.56 t/d and consists of >98% nitrogen, 0.5% uncondensable gases (methane and ethane) and <1.5% low-boiling siloxanes and silanes. The HTF losses for replacement are altogether <11 kg/d.

As a result of the condensate reflux a temperature of 166° C. is established in the drainage tank. The nitrogen consumption in the drainage vessel for volume compensation during return of HTF from the drainage tank into the HTF circuit during night-time cooling is 550 kg/d.

Due to the fill-level control means the nitrogen consumption in the expansion vessel is negligibly small.

The following steady-state gas concentrations are established in the HTF: $N_2$ 421 ppm, $H_2$ 0.1 ppm, alkanes (methane, ethane) <10 ppm.

Example 2

The average temperature in the non-insulated expansion vessel and in the drainage tank is 200° C. After the two-stage partial condensation (condensation temperatures 65° C. and −20° C. as in example 1) there remain 0.57 t/d of off-gas consisting of 99% nitrogen, 0.5% uncondensable gases (methane and ethane) and <0.5% low-boiling siloxanes and silanes. The HTF losses for replacement are altogether <6 kg/d.

The invention claimed is:

1. A method for the removal of gaseous decomposition products from a high temperature heat transfer fluid (HTF) of an operational solar thermal power plant having an HTF circuit, in which a volume increase of the HTF in the HTF circuit which is caused by incident solar radiation in an HTF-traversed solar field and consequently heating by day takes place regularly in a day-night cycle, comprising:
   collecting from the HTF circuit the additional volume formed by the volume increase in an expansion vessel;
   transferring a portion of the additional volume of the HTF into a drainage vessel operated at relatively low pressure in which gaseous decomposition products and low-boiling constituents escape from the HTF, wherein the low-boiling constituents are condensed; and
   recycling a portion of the additional volume of the HTF, resulting from the volume contraction of the HTF occurring during the night time cooling, from the drainage vessel into the expansion vessel and from the expansion vessel into the HTF circuit or directly from the drainage vessel into the HTF circuit, wherein the volumes in the expansion vessel and the drainage vessel becoming vacant as a result of the transferrals of the HTF are filled with an inert gas.

2. The method according to claim 1, wherein the HTF is silicone oil.

3. The method according to claim 1, wherein the condensation of the low-boiling constituents of the HTF is carried out as a multi-stage condensation.

4. The method of claim 1, wherein the expansion vessel has smaller dimensions than the drainage vessel.

5. The method of claim 1, wherein the inert gas is selected from the group consisting of He, Ar, Ne and $N_2$.

6. The method of claim 1, wherein the HTF in the solar field in daytime operation has a temperature between about 150° C. to 475° C.

7. The method of claim 1, wherein the HTF circuit has a pressure of about 15 to 50 bar.

8. The method of claim 1, wherein the low-boiling constituents have a vapour pressure of at least 1 mbar at 20° C.

9. The method of claim 1, wherein heat is intermediately stored in a salt melt.

10. The method of claim 1, wherein the expansion vessel has a fill-level control means installed which actuates a liquid-side flash valve and decompresses into the drainage vessel the additional volume of the HTF transferred into the drainage vessel.

* * * * *